US 9,809,056 B1

(12) United States Patent
Rembisz et al.

(10) Patent No.: US 9,809,056 B1
(45) Date of Patent: Nov. 7, 2017

(54) ROLLER ASSEMBLIES FOR A HOLONOMIC BASE

(71) Applicant: X Development LLC, Mountain View, CA (US)

(72) Inventors: Justine Rembisz, San Francisco, CA (US); Christopher Lynn Morey, Oakland, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 14/952,970

(22) Filed: Nov. 26, 2015

(51) Int. Cl.
*B60B 19/00* (2006.01)
*B60B 19/12* (2006.01)
*B60B 19/14* (2006.01)

(52) U.S. Cl.
CPC ............ *B60B 19/003* (2013.01); *B60B 19/12* (2013.01); *B60B 19/14* (2013.01)

(58) Field of Classification Search
CPC ........ B60B 19/12; B60B 19/003; B60B 19/14
USPC ....................................................... 301/5.23
See application file for complete search history.

(56) References Cited

U.S. PATENT DOCUMENTS

| 4,519,466 A * | 5/1985 | Shiraishi | B60B 19/00 180/252 |
| 4,715,460 A * | 12/1987 | Smith | A61G 5/046 180/210 |
| 5,720,529 A * | 2/1998 | Barron | A63C 17/24 301/5.23 |
| 6,896,078 B2 * | 5/2005 | Wakui | B25J 5/007 180/212 |
| 7,013,200 B2 * | 3/2006 | Wakui | G05D 1/0272 180/7.1 |

(Continued)

FOREIGN PATENT DOCUMENTS

| CA | 2418139 A1 * | 2/2002 | ............ B60B 19/12 |
| CN | 201980014 | 9/2011 | |

(Continued)

OTHER PUBLICATIONS

Ren, C., & Ma, S. (Nov. 2013). Dynamic Modeling and Analysis of an Omnidirectional Mobile Robot. In Intelligent Robots and Systems (IROS), 2013 IEEE/RSJ International Conference on (pp. 4860-4865). IEEE.

(Continued)

*Primary Examiner* — Kip T Kotter
*Assistant Examiner* — Scott A Browne
(74) *Attorney, Agent, or Firm* — Middleton Reutlinger

(57) ABSTRACT

Holonomic bases, and drive shafts and roller assemblies that can be used in the holonomic bases. In some implementations, a holonomic base includes at least two pairs of roller assemblies, with each of the pairs being coupled to a corresponding drive shaft. In some of those implementations, each of the roller assemblies of each pair includes three roller segments that are each coupled to the corresponding drive shaft and that each include an exposed outward facing spherical zone that approximates a portion of the surface of a sphere. The roller segments of each roller assembly are in fixed relation to one another relative to the rotational axis of a drive shaft to which the roller assembly is coupled, but the roller segments each freely rotate about a corresponding roller segment rotational axis that extends outward from the drive shaft.

20 Claims, 11 Drawing Sheets

(56) References Cited

U.S. PATENT DOCUMENTS

| | | | | |
|---|---|---|---|---|
| 7,441,786 B2 * | 10/2008 | Stryker et al. | ...... | B60B 33/0005 16/45 |
| 7,463,001 B2 * | 12/2008 | Tsurukawa | ............. | A63H 11/10 318/568.12 |
| 8,424,621 B2 * | 4/2013 | Uehara | ................... | B60B 19/12 180/7.1 |
| 8,944,446 B1 * | 2/2015 | Cottingham | .......... | B60B 19/003 180/252 |

FOREIGN PATENT DOCUMENTS

| | | | | | |
|---|---|---|---|---|---|
| CN | 201980014 U | * | 9/2011 | ............. | B60B 19/12 |
| CN | 204236614 | | 4/2015 | | |
| CN | 204236614 U | * | 4/2015 | ............. | B60B 19/12 |
| CN | 204263837 | | 4/2015 | | |
| CN | 104714549 A | * | 6/2015 | ............. | B60B 19/12 |

OTHER PUBLICATIONS

Ma, S., Ren, C., & Ye, C. (Dec. 2012). An Omnidirectional Mobile Robot: Concept and Analysis. In Robotics and Biomimetics (ROBIO), 2012 IEEE International Conference on (pp. 920-925). IEEE.

Spherical Omnidirectional Wheel: "Omni-Ball," Kaneko Higashimori Laboratory, Osaka University, Accessed Sep. 29, 2015, http://www-hh.mech.eng.osaka-u.ac.jp/robotics/Omni-Ball_e. html, 3 pages.

* cited by examiner

US 9,809,056 B1

ROLLER ASSEMBLIES FOR A HOLONOMIC BASE

BACKGROUND

In the mobile robotics industry, it may be beneficial and/or necessary for some robots to have a high degree of mobility. For example, it may be beneficial and/or necessary for a mobile robot to have a holonomic drivetrain having a holonomic base. A holonomic base enables the controllable degrees of freedom of the mobile robot to be equal to the total degrees of freedom in a dimensional space. For example, for a two-dimensional space the degrees of freedom of a holonomic base are the X axis, the Y axis, and rotation about the origin—and a holonomic drivetrain having a holonomic base would be controllable in the X axis, the Y axis, and about the origin.

One solution to achieve a holonomic drivetrain of a mobile robot is to use omni-wheels on the base of the mobile robot. One example of an omni-wheel is a Mecanum wheel, which is a conventional wheel with a series of rollers attached to its circumference. These rollers typically each have an axis of rotation at 45° to the plane of the wheel and at 45° to a line through the center of the roller parallel to the axis of rotation of the wheel. However, Mecanum wheels and/or other existing omni-wheels may present one or more drawbacks. For example, Mecanum wheels may be inefficient, noisy, and/or costly. For instance, Mecanum wheels have a relatively large number of component parts and those component parts may be costly and/or time invested in assembling the component parts may be costly. Additional and/or alternative drawbacks of the aforementioned techniques and/or other techniques may be presented.

SUMMARY

The present disclosure is generally directed to roller assemblies that can be used in a holonomic base of a holonomic drivetrain of a mobile robot. In some implementations, a holonomic base includes at least two pairs of roller assemblies, with each of the pairs being coupled to a corresponding drive shaft of the holonomic base. In some of those implementations, each of the roller assemblies of each pair includes three roller segments that are each coupled to the corresponding drive shaft and that each include an exposed outward facing spherical zone that approximates a portion of the surface of a sphere.

The roller segments of each roller assembly are in fixed relation to one another relative to a rotational axis of the corresponding drive shaft to which they are coupled. In other words, when the drive shaft rotates, the roller segments coupled to the drive shaft rotate in fixed relation to one another about the rotational axis of the drive shaft. Although the roller segments are in fixed relation to one another relative to the rotational axis of the drive shaft, they each freely rotate about a corresponding roller segment rotational axis that extends outward from the drive shaft. For example, the three roller segment rotational axes may be spaced approximately (e.g., exactly, or +/−<1°)120° about the drive shaft relative to one another and each of the roller segments may rotate about (e.g., via one or more bearings), a corresponding one of the roller segment rotational axes.

In some implementations, an apparatus for a holonomic base may be provided that includes a drive shaft, a first roller assembly, and a second roller assembly. The drive shaft has a first longitudinal end, a second longitudinal end, and a drive shaft rotational axis extending between the first longitudinal end and the second longitudinal end. The first roller assembly and the second roller assembly each have three roller segments each coupled to the drive shaft. The three roller segments of the first roller assembly and the three roller segments of the second roller assembly each have an exposed exterior spherical zone. The spherical zone of each of the roller segments has a base and an opposite top. The base has a base circumference that is larger than any top circumference of the top and the base is more proximal to the drive shaft than the top. Each of the three roller segments of the first roller assembly rotates freely about a corresponding one of three roller segment rotational axes that each extend outward from the drive shaft. The three roller segment rotational axes are spaced approximately one-hundred-twenty degrees apart from one another relative to the drive shaft rotational axis. Each of the three roller segments of the second roller assembly rotates freely about a corresponding one of three additional roller segment rotational axes that each extend outward from the drive shaft. The three additional roller segment rotational axes are spaced approximately one-hundred-twenty degrees apart from one another relative to the drive shaft rotational axis. The roller segments of the first roller assembly and the roller segments of the second roller assembly are in fixed relation to one another relative to the drive shaft rotational axis.

This and other implementations of technology disclosed herein may each optionally include one or more of the following features.

In some implementations, the top of the spherical zone defines a circle having the top circumference that is smaller than the base circumference of the base. In some of those implementations, the additional roller segment rotational axes of the roller segments of the second roller assembly are offset, relative to the drive shaft rotational axis, approximately sixty degrees from the roller segment rotational axes of the roller segments of the first roller assembly. In some of those implementations, the roller segments of the first roller assembly and the roller segments of the second roller assembly each further include a corresponding one of six roller balls. Each of the six roller balls is freely rotating, is coupled to a corresponding one of the roller segments, and extends above the top of the spherical zone of the corresponding one of the roller segments.

In some implementations, the apparatus further includes a cover that covers a first opening between the bases of the roller segments of the first roller assembly. The cover rotates about the drive shaft axis in unison with the roller segments of the first roller assembly. In some of those implementations, the apparatus further includes an additional cover that covers a second opening between the bases of the roller segments of the first roller assembly. The additional cover rotates about the drive shaft axis in unison with the roller segments of the first roller assembly.

In some implementations, each of the roller segments of the first roller assembly further includes a chamfered portion that extends inward from the base toward the drive shaft and that abuts the chamfered portion of the other roller segments of the first roller assembly.

In some implementations, the apparatus further includes three first roller assembly roller segment shafts. Each of the first roller assembly roller segment shafts is coupled to a corresponding one of the three roller segments of the first roller assembly, is coupled to the drive shaft, and extends along a corresponding one of the roller segment rotational axes. In some of those implementations, each of the roller segments of the first roller assembly rotates about a corresponding one of the first roller assembly roller segment shafts and each of the first roller assembly roller segment shafts is non-rotatably coupled to the drive shaft. In some of those implementations, each of the roller segments of the first roller assembly is over-molded onto a corresponding insert and each of the inserts is rotatably coupled to a corresponding one of the first roller assembly roller segment shafts.

In some implementations, the apparatus further includes a first frame coupled to the drive shaft and a second frame coupled to the drive shaft. The roller segments of the first roller assembly are coupled to the drive shaft via the first frame and the roller segments of the second roller assembly are coupled to the drive shaft via the second frame. In some of those implementations, the drive shaft comprises a first keying feature at a first location along the drive shaft and a second keying feature at a second location along the drive shaft. The first frame is coupled to the drive shaft at the first location, the second frame is coupled to the drive shaft at the second location, the first keying features restricts options for coupling of the first fame to the drive shaft at the first location, and the second keying feature restricts options for coupling of the second frame to the drive shaft at the second location. For example, the first keying feature and the second keying feature may collectively restrict the roller segment rotational axes of the roller segments of the second roller assembly to being offset, relative to the drive shaft rotational axis, approximately sixty degrees from the roller segment rotational axes of the roller segments of the first roller assembly.

In some implementations, an apparatus for a holonomic base may be provided that includes a drive shaft, a first roller assembly, and a second roller assembly. The drive shaft includes a first longitudinal end, a second longitudinal end, and a drive shaft rotational axis extending between the first longitudinal end and the second longitudinal end. The first roller assembly and the second roller assembly each include at least three roller segments each coupled to the drive shaft. The roller segments of the first roller assembly and the roller segments of the second roller assembly each include an exposed exterior spherical zone, and a corresponding one of at least three roller balls. The spherical zone of each of the roller segments comprises a base and an opposite top, the base has a base circumference that is larger than a top circumference of the top, and the base is more proximal to the drive shaft than the top. Each of the roller balls is freely rotating, is coupled to a corresponding one of the roller segments, and extends above the top of the spherical zone of the corresponding one of the roller segments. Each of the roller segments of the first roller assembly rotates freely about a corresponding one of at least three roller segment rotational axes that each extend outward from the drive shaft. The roller segment rotational axes are spaced equidistant to one another relative to the drive shaft rotational axis. Each of the roller segments of the second roller assembly rotates freely about a corresponding one of at least three additional roller segment rotational axes that each extend outward from the drive shaft. The additional roller segment rotational axes are spaced equidistant to one another relative to the drive shaft rotational axis. The roller segments of the first roller assembly and the roller segments of the second roller assembly are in fixed relation to one another relative to the drive shaft rotational axis.

This and other implementations of technology disclosed herein may each optionally include one or more of the following features.

In some implementations, the apparatus further includes a cover that covers a first opening between the bases of the roller segments of the first roller assembly. The cover rotates about the drive shaft axis in unison with the roller segments of the first roller assembly. In some of those implementations, the apparatus further includes an additional cover that covers a second opening between the bases of the roller segments of the first roller assembly. The additional cover rotates about the drive shaft axis in unison with the roller segments of the first roller assembly.

In some implementations, each of the roller segments of the first roller assembly further includes a chamfered portion that extends inward from the base toward the drive shaft and that abuts the chamfered portion of the other roller segments of the first roller assembly.

In some implementations, the apparatus further includes first roller assembly roller segment shafts. Each of the first roller assembly roller segment shafts is coupled to a corresponding one of the roller segments of the first roller assembly, is coupled to the drive shaft, and extends along a corresponding one of the roller segment rotational axes. In some of those implementations, each of the roller segments of the first roller assembly rotates about a corresponding one of the first roller assembly roller segment shafts and each of the first roller assembly roller segment shafts is non-rotatably coupled to the drive shaft.

In some implementations, an apparatus for a holonomic base is provided that includes a drive shaft, a first roller assembly, a second roller assembly, a first frame, and a second frame. The drive shaft includes a first longitudinal end, a second longitudinal end, a drive shaft rotational axis extending between the first longitudinal end and the second longitudinal end, a first keying feature at a first location along the drive shaft, and a second keying feature at a second location along the drive shaft. The first roller assembly and the second roller assembly each include a plurality of roller segments each coupled to the drive shaft. The roller segments of the first roller assembly and the roller segments of the second roller assembly each include an exposed exterior spherical zone. The spherical zone of each of the roller segments includes a base and an opposite top. The base has a base circumference that is larger than a top circumference of the top and the base is more proximal to the drive shaft than the top. Each of the roller segments of the first roller assembly rotates freely about a corresponding one of a plurality of roller segment rotational axes that each extend outward from the drive shaft. The roller segment rotational axes are spaced equidistant to one another relative to the drive shaft rotational axis. Each of the roller segments of the second roller assembly rotates freely about a corresponding one of a plurality of additional roller segment rotational axes that each extend outward from the drive shaft. The additional roller segment rotational axes are spaced equidistant to one another relative to the drive shaft rotational axis. The first frame is coupled to the drive shaft at the first location and couples the roller segments of the first roller assembly to the drive shaft. The second frame is coupled to the drive shaft at the second location and couples the roller segments of the second roller assembly to the drive shaft. The first keying feature restricts the coupling of the first fame to the drive shaft at the first location and the second keying feature restricts the coupling of the second frame to the drive shaft at the second location. The first keying feature and the second keying feature collectively restrict the roller segment rotational axes of the roller segments of the second roller assembly to being offset, relative to the drive shaft rotational axis, from the roller segment rotational axes of the roller segments of the first roller assembly.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
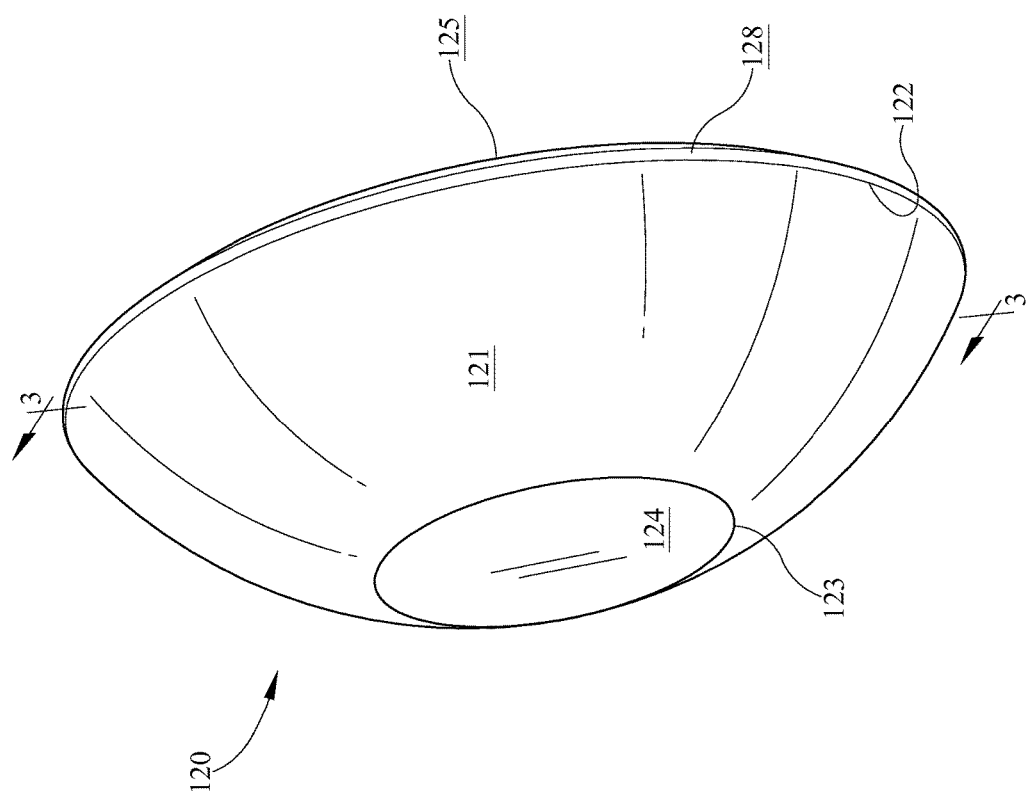
FIG. 1 illustrates a perspective view of an example roller segment.
Figure 2:
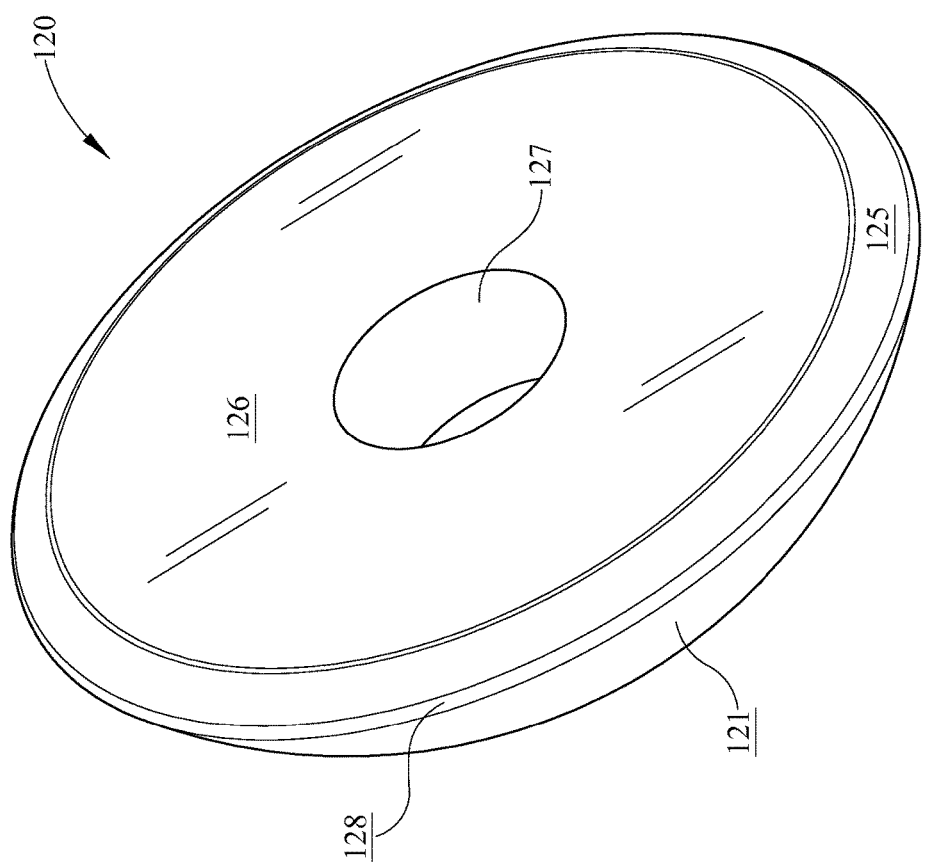
FIG. 2 illustrates an additional perspective view of the example roller segment of FIG. 1.
Figure 3:
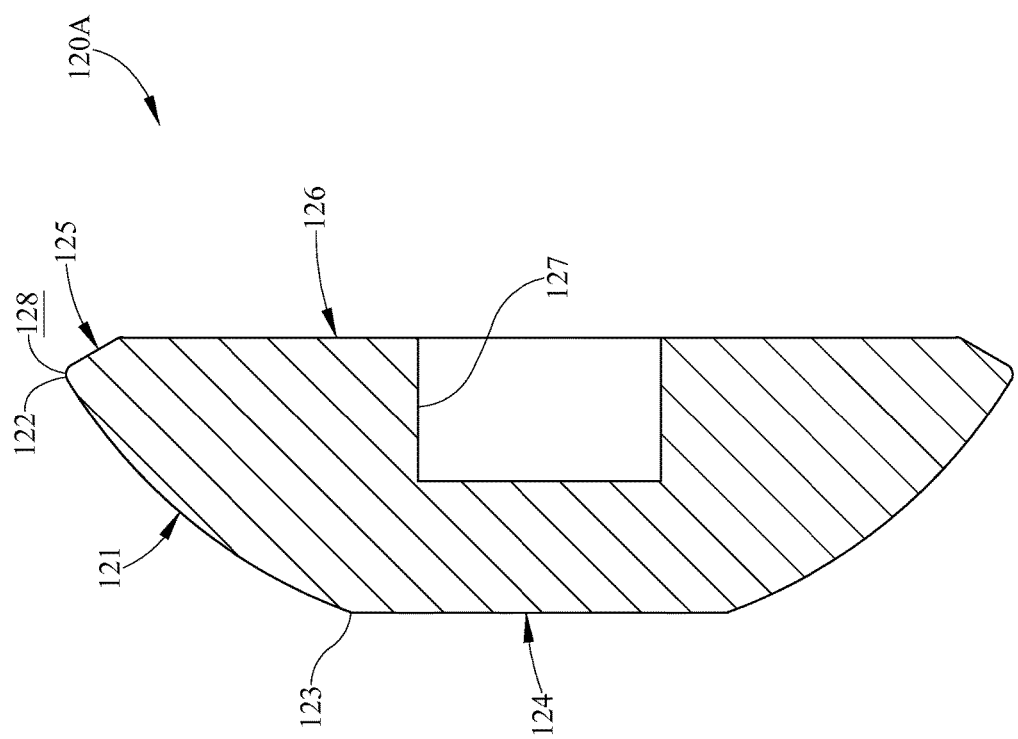
FIG. 3 illustrates a section view of the roller segment of FIGS. 1 and 2, taken along the section line 3-3 of FIG. 1.

An overview of an example roller segment 120 is initially provided with reference to FIGS. 1-3. FIGS. 1 and 2 illustrate perspective views of the roller segment 120. FIG. 3 illustrates a section view of the roller segment 120 taken along the section line 3-3 of FIG. 1. As described below with respect to FIGS. 4-11, one or more of the multiple roller segments that form part of the roller assemblies of FIGS. 4-11 may each share one or more (e.g., all) aspects in common with the roller segment 120. In some implementations, the roller segment 120 may be formed (e.g. molded) from a polymer material, such as polyurethane.

The roller segment 120 includes an exposed exterior spherical zone 121. The spherical zone 121 corresponds to the outer surface of a portion of a sphere and the spherical zone 121 extends between a base 122 and a top 123 that is opposite the base 122. When the roller segment 120 is assembled as part of a roller assembly of a pair of roller assemblies integrated in a holonomic base of a holonomic drive train as described herein, the spherical zone 121 of the roller segment 120 is an exposed exterior portion of the roller segment 120 that will contact a surface during various stages of driving of the holonomic drive train.

The top 123 of the spherical zone 121 defines an upper extent of the portion of the sphere to which spherical zone 121 conforms. In FIGS. 1-3 the top 123 is defined by the circumference of a planar surface 124 that truncates the top of the sphere to which the spherical zone 121 partially conforms. The base 122 defines a lower extent of the portion of the sphere to which spherical zone 121 conforms. The top 123 has a circumference that is less than a circumference defined by the base 122. In particular, the circle defined by the top 123 has a circumference that is less than a circle whose circumference is defined by the base 122.

A small arcuate section 128 is interposed between the base 122 and a chamfered portion 125 that extends to a lower surface 126 of the roller segment 120. The arcuate section 128 and the chamfered portion 125 do not conform to the sphere that is partially conformed to by the spherical zone 121. The arcuate section 128 and the chamfered portion 125 both extend in a direction that is inward from the base 122 and away from the top 123. The arcuate section 128 and the chamfered portion 125 both extend in a direction that is away from the surface of the sphere that is partially conformed to by the spherical zone 121 and that is generally towards a center of that sphere.

A receptacle 127 is provided in the lower surface 126 to facilitate connection of the roller segment 120 to a drive shaft. As described herein, when it is assembled as part of a roller assembly, the roller segment 120 may be coupled to a drive shaft (e.g., an indirect coupling) so that it is in fixed relation to a rotational axis of the drive shaft, but that it freely rotates about a roller shaft axis that extends outward from the drive shaft. For example, when it is assembled as part of a roller assembly, the roller segment 120 may rotate about an axis that extends through a center of the circle defined by the top 123 and a center of the circle defined by the base 122. Although the receptacle 127 is illustrated in FIGS. 1-3 as a cylinder, the receptacle may take on alternative shapes. For example, as described and illustrated herein (e.g., FIG. 6), in some implementations the roller segment 120 may be over-molded onto an insert and the receptacle 127 may have a shape that substantially conforms to the insert.

Figure 10:
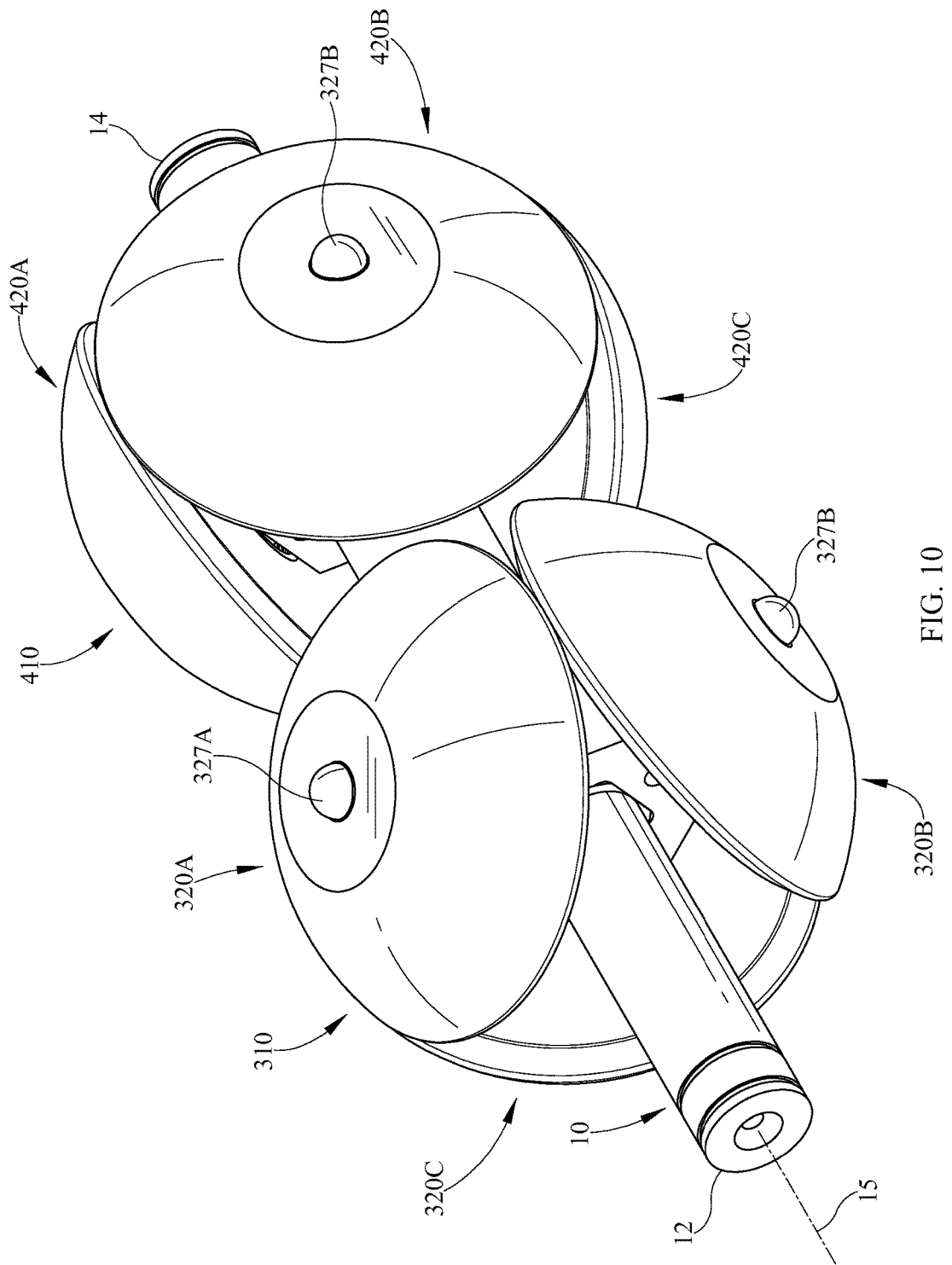
FIG. 10 illustrates another pair of roller assemblies coupled to a drive shaft, with each of the roller assemblies including three roller segments each having a freely rotating roller ball extending above a top of a spherical zone thereof.

Although FIGS. 1-3 and other Figures herein illustrate specific examples of roller segments, in some implementations one or more roller segments of a roller assembly may vary from those illustrated. For example, in some implementations the lower surface 126 may not be flat. For instance, it may be concave, convex, and/or undulate. Also, for example, in some implementations the arcuate section 128 may be omitted and the base 122 may be immediately adjacent the chamfered portion 125. Also, for example, in some implementations, the planar surface 124 may be replaced by an alternative surface, such as a concave surface, or a convex and/or undulating surface that does not extend to the surface of the sphere to which the spherical zone 121 partially conforms. Also, for example, in some implementations, a roller ball may be provided interior to the circumference of the top 123 and extending at least partially above the top 123. For example, the roller ball may be partially housed in the planar surface 124 and/or other surface (e.g., as illustrated in FIG. 10).

With reference to FIGS. 4-9, a pair of roller assemblies 110 and 210 coupled to a longitudinally extending drive shaft 10 are illustrated. The drive shaft 10 includes a first longitudinal end 12, a second longitudinal end 14, and a drive shaft rotational axis 15 extending between the longitudinal ends 12 and 14. As described herein, the drive shaft 10 may be mechanically coupled to, and driven by, a motor or other actuator. The drive shaft 10 may be driven to rotate the drive shaft 10 in a first direction about the drive shaft rotational axis 15 and/or in a second direction about the rotational axis 15. For example, the drive shaft 10 may be coupled (e.g., directly, or via a belt and/or a chain) to a reversible multi-speed motor and may be rotated by the motor at any one of a plurality of speeds in a first direction and at any one of a plurality of speeds in a second direction.

The roller assembly 110 includes three roller segments 120A, 120B, and 120C and the roller assembly 210 includes three roller segments 220A, 220B, and 220C. In FIGS. 4-9, the roller segments 120A-C and 220A-C are each the same as the roller segment 120 illustrated in FIGS. 1-3. For simplification of FIGS. 4-9, the roller segments 120A-C and 220A-C are not provided in FIGS. 4-9 with the same detailed numbering of FIGS. 1-3.

The three roller segments 120A-C of roller assembly 110 are in fixed relation to one another relative to the drive shaft rotational axis 15 and the three roller segments 220A-C of roller assembly 210 are also in fixed relation to one another relative to the rotational axis 15 of the drive shaft 10. Accordingly, the three roller segments 120A-C and the three roller segments 220A-C are also in fixed relation to one another relative to the drive shaft rotational axis 15. In other words, when the drive shaft 10 rotates, the roller assemblies 110 and 210 rotate in unison in fixed relation to one another relative to the drive shaft rotational axis 15.

Figure 8:
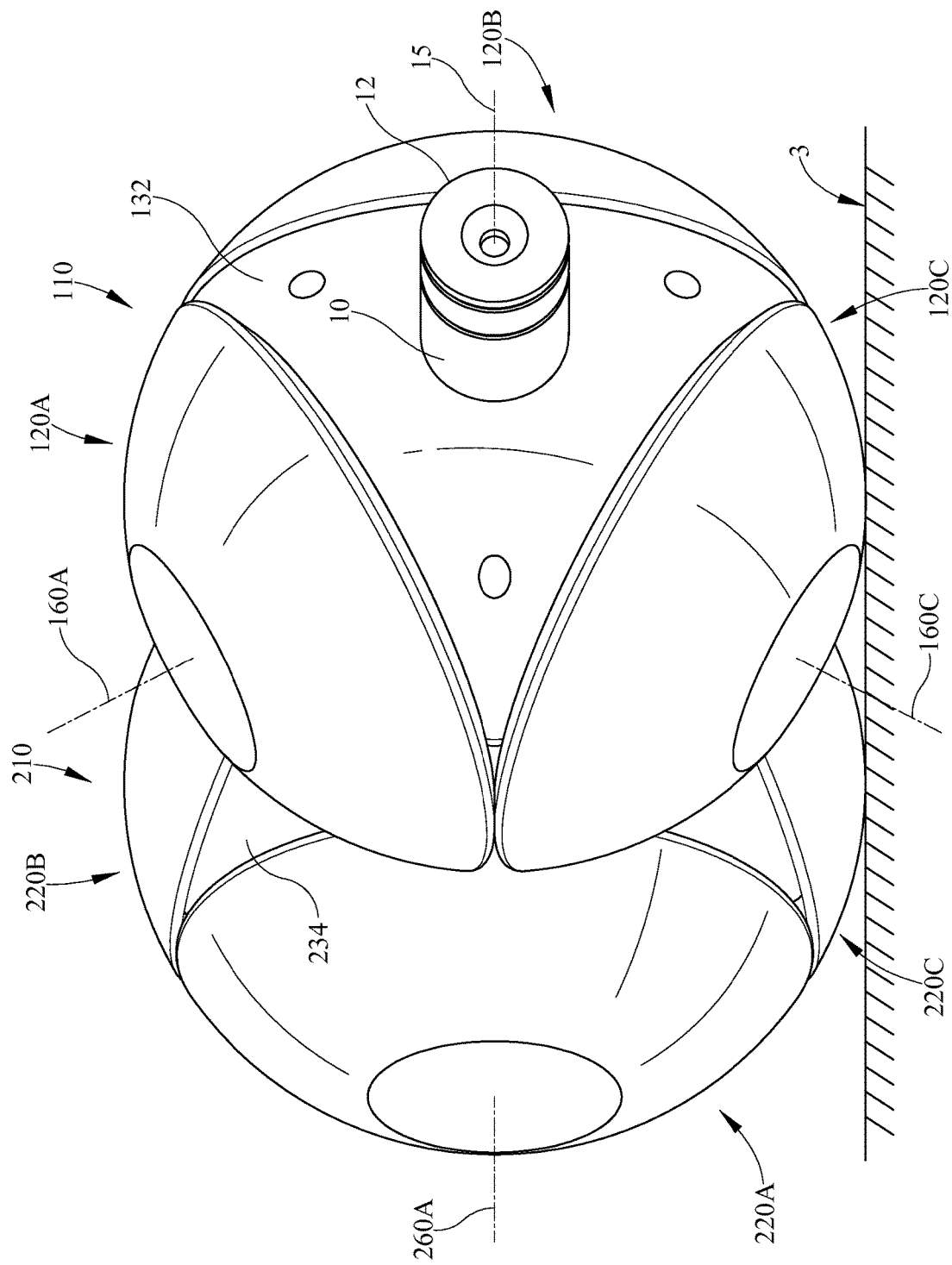
FIG. 8 illustrates a side perspective view of the pair of roller assemblies and the drive shaft of FIG. 7 placed on a floor, with the drive shaft at a first rotational orientation about its drive axis.
Figure 9:
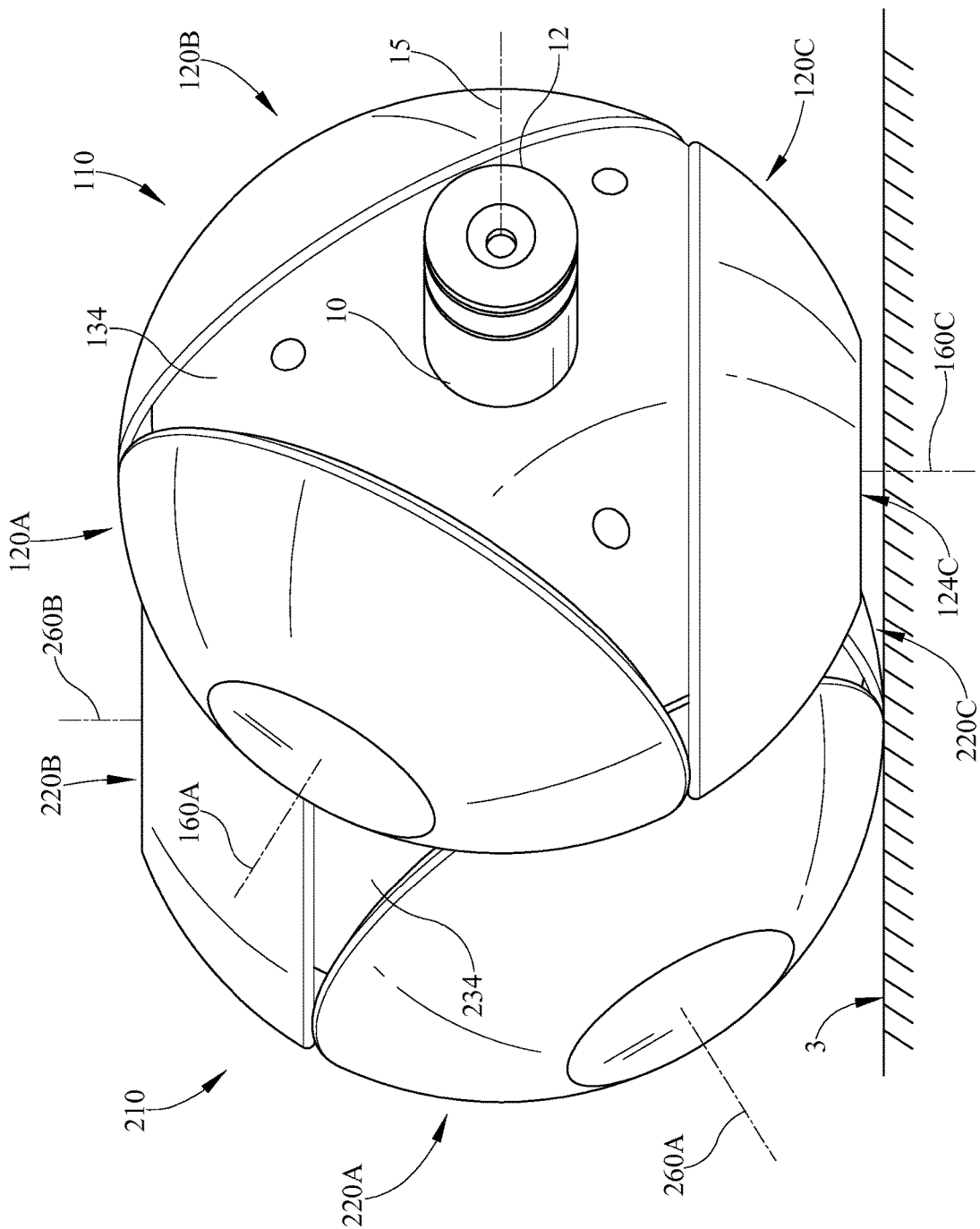
FIG. 9 illustrates a side perspective view of the pair of roller assemblies and the drive shaft of FIG. 7 placed on a floor, with the drive shaft at a second rotational orientation about its drive axis that is different from the first rotational orientation of FIG. 8.

The fixed relation of the roller assemblies 110 and 210 to one another relative to the rotational axis 15 of the drive shaft 10 is illustrated, for example, in FIGS. 8 and 9. FIG. 8 illustrates a side perspective view of the pair of roller assemblies 110, 210 and the drive shaft 10 placed on a floor 3, with the drive shaft 10 at a first rotational orientation about the drive shaft rotational axis 15. FIG. 9 illustrates a side perspective view of the pair of roller assemblies 110, 210 and the drive shaft 10 placed on the floor 3, with the drive shaft 10 at a second rotational orientation about the drive shaft rotational axis 15. As illustrated in FIGS. 8 and 9, the relation of the roller segments 120A-C and 220A-C to one another relative to the drive shaft rotational axis 15 is maintained at the first rotational orientation of FIG. 8 and the second rotational orientation of FIG. 9.

Although the roller segments 120A-C and 220A-C are in fixed relation to one another relative to the drive shaft rotational axis 15, they each freely rotate about a corresponding roller segment rotational axis that extends outward from the drive shaft 10. For example, the roller segment rotational axis of each of the roller segments 120A-C and 220A-C may extend perpendicular to the drive shaft rotational axis 15 and through a center of the base of the roller segment and a center of the top of the roller segment and enable rotation of the roller segment without wobble of the roller segment.

Roller segment rotational axes 160A-C of roller segments 120A-C and roller segment rotational axes 260A-C of roller segments 120A-C are indicated in FIGS. 4-9. The roller segment rotational axes 160A-C are spaced approximately 120° about the drive shaft 10 relative to one another and the roller segment rotational axes 260A-C are likewise spaced approximately 120° about the drive shaft 10 relative to one another. As used herein with reference to spacing between roller segment rotational axes, approximately means exactly, or within 2°. Moreover, the two roller assemblies 110 and 210 are coupled to the drive shaft 10 such that the roller segment rotational axes 160A-C of the roller segments 120A-C are offset approximately 60° about the drive shaft rotational axis relative to the roller segment rotational axes 260A-C of the roller segments 220A-C.

Figure 4:
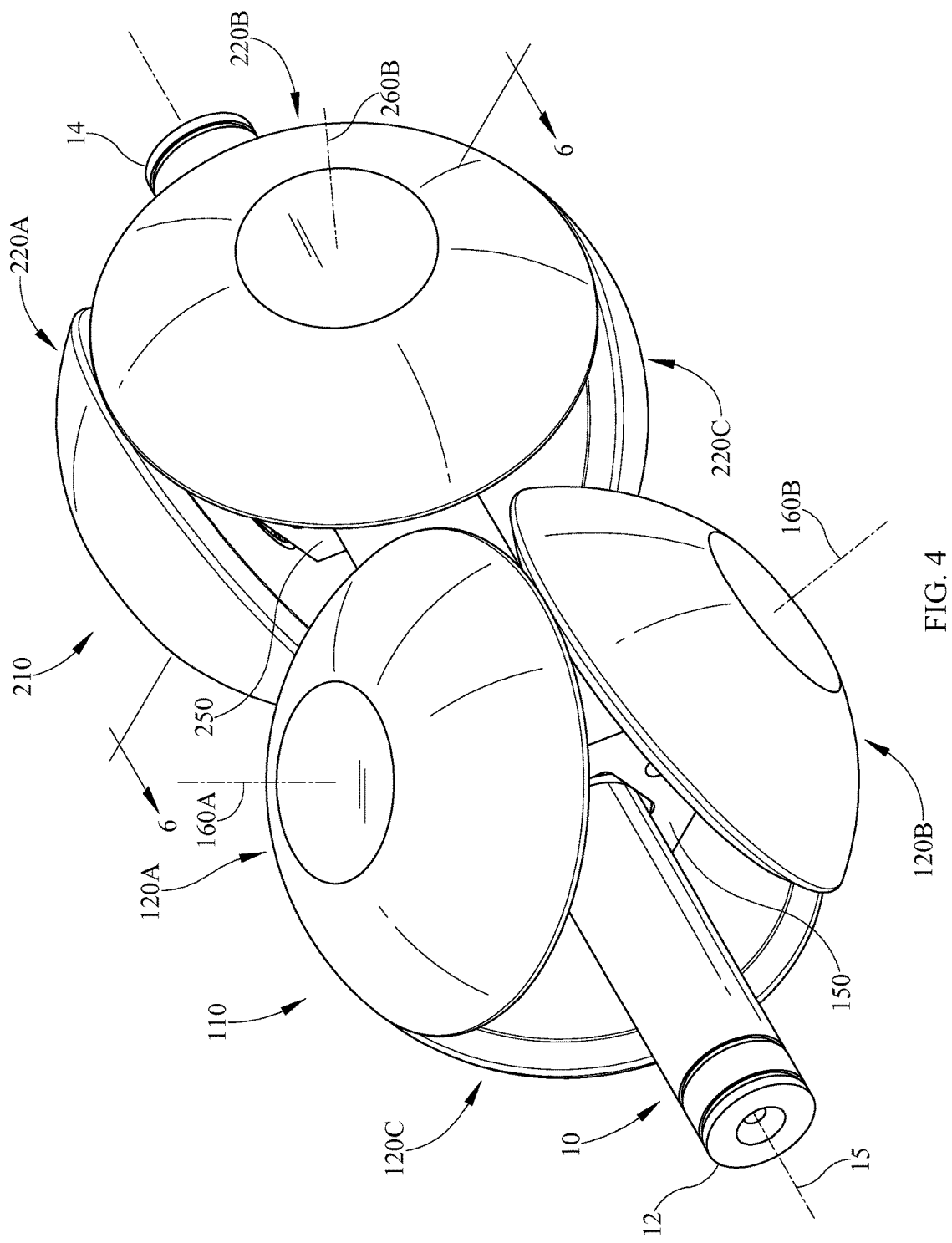
FIG. 4 illustrates a pair of roller assemblies coupled to a drive shaft, with each of the roller assemblies including three roller segments.

As described in more detail herein, the offset of the roller segment rotational axes 160A-C relative to the roller segment rotational axes 260A-C aligns the abutment (touching or in close proximity) locations of the roller segments 220A-C of the roller assembly 210 with the top planar surfaces of the roller segments 120A-C of the assembly 110—and vice versa. For example, as illustrated in FIG. 4, the center of the top planar surface of the roller segment 120A is aligned with the abutment location of the roller segments 220A and 220B. Also, for example, and as also illustrated in FIG. 4, the center of the top planar surface of the roller segment 220B is aligned with the abutment location of the roller segments 120A and 120B.

As a result of the offset of the roller segment rotational axes 160A-C relative to the roller segment rotational axes 260A-C, constant contact between ground and a spherical zone of at least one of the roller segments 120A-C and 220A-C is maintained in various environments (e.g., when the ground is flat) when the drive shaft 10 and roller assemblies 110 and 210 are incorporated in a holonomic base. For example, as illustrated in FIG. 8, the spherical zone of the roller segment 120C and the spherical zone of the roller segment 220C are both in contact with the ground 3 at the first rotational orientation of FIG. 8. Moreover, as illustrated in FIG. 9, the spherical zone of the roller segment 220A and the spherical zone of the roller segment 220C are both in contact with the ground 3 at the second rotational orientation of FIG. 9—even though there is no contact between the ground 3 and the roller assembly 110 at the second rotational orientation. In some implementations, various suspension techniques may be implemented in combination with the drive shaft 10, each of the roller assemblies 110 and 210, and/or with each of the roller segments 120A-C and 220A-C to promote constant contact between the ground and a spherical zone of at least one of the roller segments 120A-C and 220A-C when the ground is uneven. For example, a spring suspension may be utilized. In some implementations, a compliant material may be utilized for each of the roller segments 120A-C and 220A-C to allow them to absorb small bumps and promote constant contact between the ground and a spherical zone of at least one of the roller segments 120A-C and 220A-C when the ground is uneven.

The offset of the roller segment rotational axes 160A-C relative to the roller segment rotational axes 260A-C, and the flat surfaces of the roller segments 120A-C and 220A-C also reduce or eliminate the so-called singularity impact. For example, with reference to FIG. 9, the flat surface 124C of the roller segment 120C is not contacting the ground 3 at the second rotational orientation of FIG. 9. Accordingly, when the roller segments 220A and 220C are rotating about their respective axes 260A and 260C (e.g., as a result of being "pulled" by rotation of another pair of roller assemblies about a corresponding drive shaft), the flat surface 124C of the roller segment 120C may not contact the ground and/or may have reduced contact with the ground (relative to if the spherical zone of the roller segment 120C continued to the top of the sphere to which it conforms, instead of being truncated as illustrated). This may reduce the singularity impact relative to roller segments without a flat surface by preventing or reducing "sliding" of the roller segment 120C on the ground 3 (or reducing the friction of any sliding on the ground 3). This reduction of the singularity impact may reduce stress on the drive shaft 10 and may enable the size of the drive shaft 10 to be reduced, may enable the drive shaft 10 to be hollow, and/or may enable a wider range of materials to be useable for manufacture of the drive shaft 10. This reduction of the singularity impact may additionally and/or alternatively make the drive more efficient overall, enabling the use of a smaller motor or other actuator that drives the drive shaft 10 (compared to actuators that may be needed where the singularity impact is not reduced) and/or enabling less power to be utilized.

Figure 5:
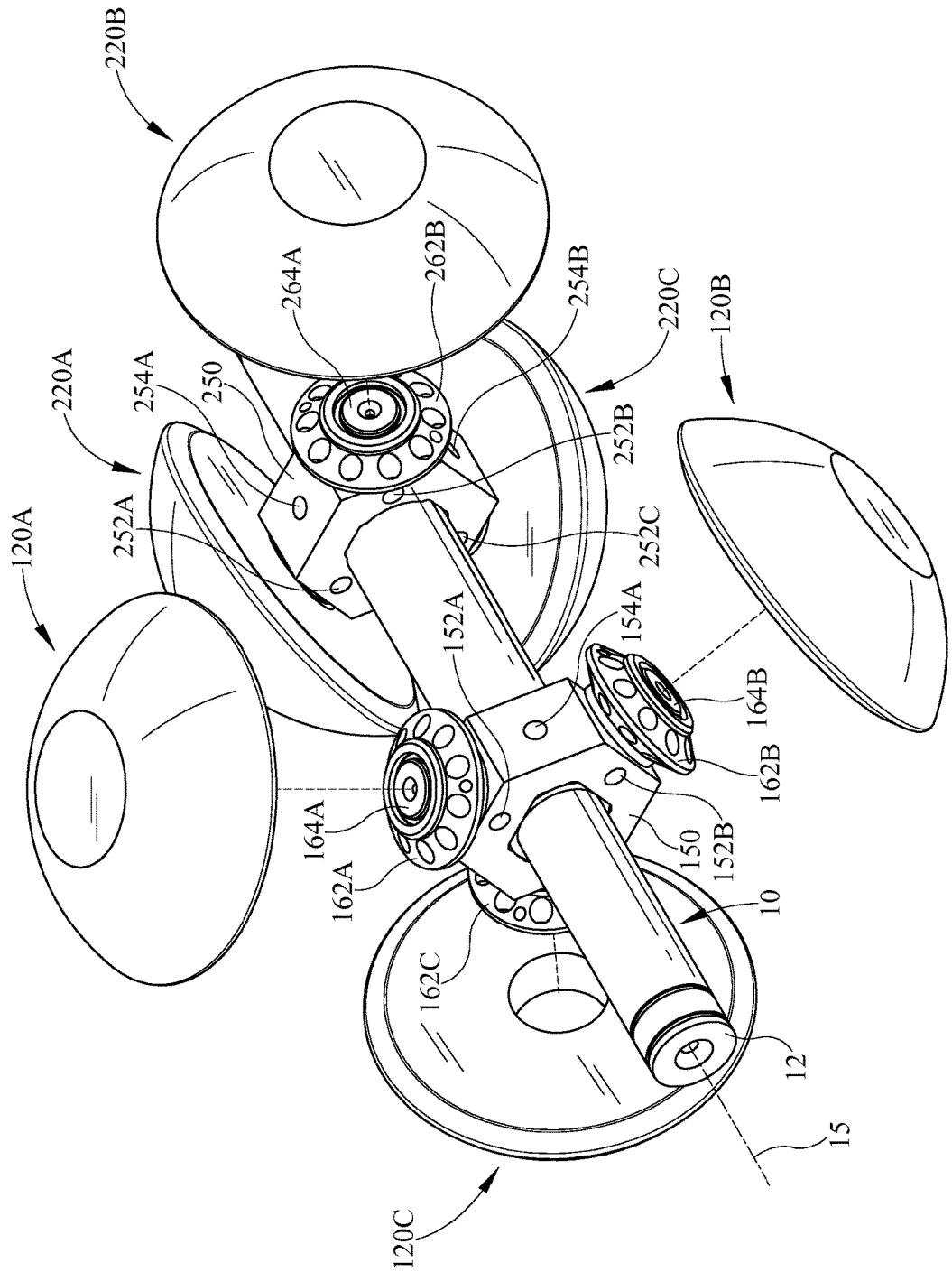
FIG. 5 illustrates the pair of roller assemblies and the drive shaft of FIG. 4, with three of the roller segments of one of the roller assemblies illustrated exploded away and one of the roller segments of the other roller assembly illustrated exploded away.
Figure 6:
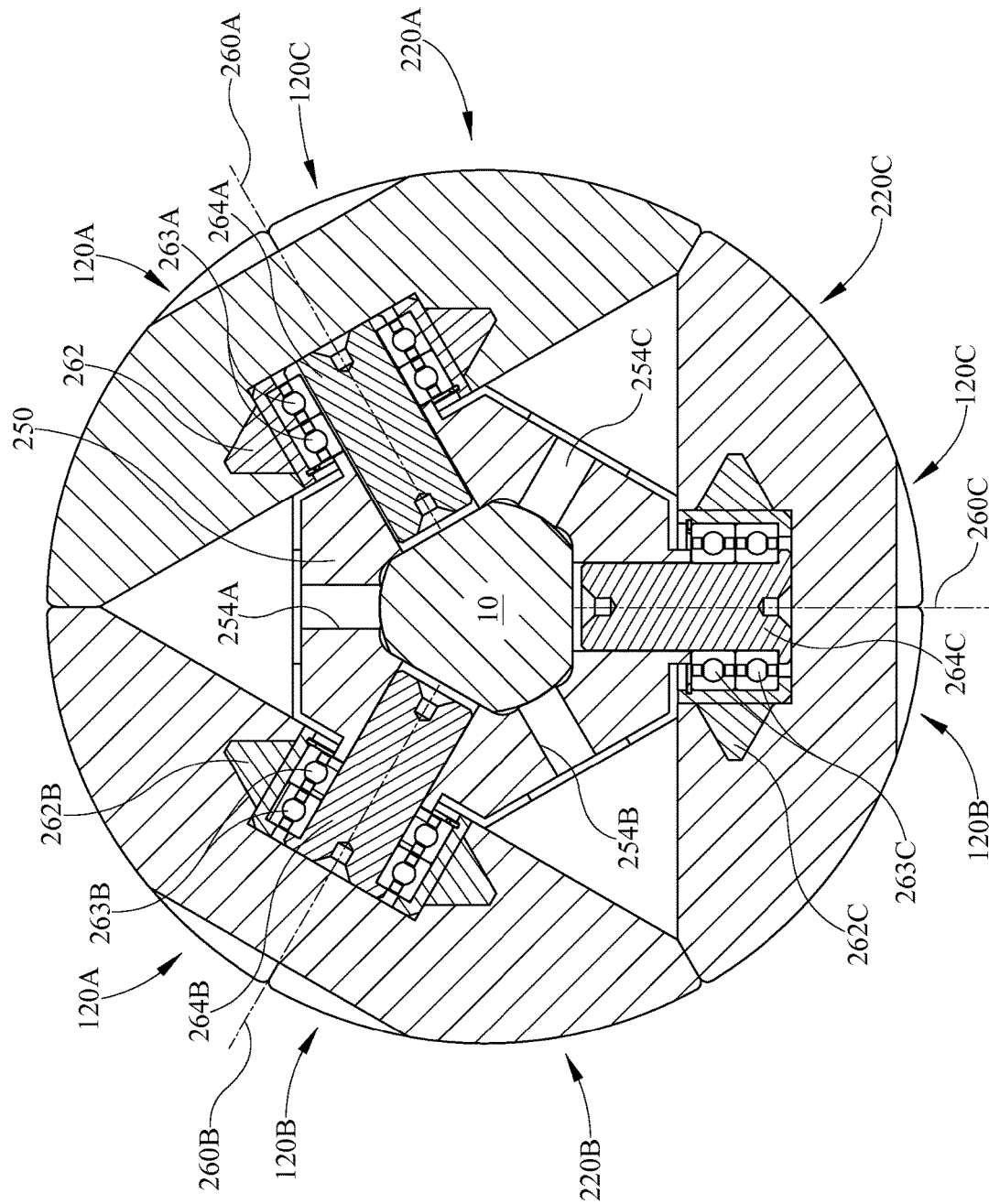
FIG. 6 illustrates a section view of the roller assemblies and the drive shaft of FIG. 4, taken along the section line 6-6 of FIG. 4.

With particular reference to FIGS. 5 and 6, additional description is provided of one implementation of a connection between the drive shaft 10 and the roller assemblies 110 and 210. The roller assemblies 110 and 210 include hexagon-shaped frames 150 and 250 that can be slid along the drive shaft 10 to corresponding locations along the drive shaft 10 and fixed to the corresponding locations using set screws and/or other fastener and/or adhesive. For example, frame 150 includes three set screw throughways, one of which is depicted in FIG. 5 as 154A. Set screws may be screwed through the set screw throughways and contact the drive shaft 10 to fix the frame 150 to the drive shaft 10. Likewise, frame 250 includes three set screw throughways 254A-C, which are depicted in FIGS. 5 and 6. Set screws may be screwed through the set screw throughways 254A-C and contact the drive shaft 10 to fix the frame 250 to the drive shaft 10.

In some implementations, the frames 150 and 250 may include keying features, and the drive shaft 10 may include corresponding keying features along at least a portion thereof. The keying features of the frames 150 and 250 and the drive shaft 10 may be configured so that when: the frames 150 and 250 are slid on the drive shaft 10, the keying features are properly engaged, and the roller segments 120A-C and 220A-C are connected to the frames 150 and 250—the roller segment rotational axes 160A-C of the roller segments 120A-C will be offset approximately 60° about the drive shaft rotational axis relative to the roller segment rotational axes 260A-C of the roller segments 220A-C.

In FIG. 6 a portion of the drive shaft 10 is illustrated, with that portion of the drive shaft 10 having a first keying feature of three flat segments. Also depicted in FIG. 6 is a keying feature of three flat segments on the interior surface of the frame 250. The frame 150 may also have a keying feature of three flat segments on its interior surface. The portion of the drive shaft 10 to which the frame 150 is coupled may have a keying feature that is similar to the keying feature illustrated in FIG. 6, but that is rotationally offset (about the drive shaft rotational axis 15) approximately 60° from the keying feature illustrated in FIG. 6. As a result of the two rotationally offset keying features of the drive shaft 10, when the frame 150 and frame 250 are coupled to respective portions of the drive shaft 10 and the roller segments 120A-C and 220A-C are connected to the frames 150 and 250—the roller segment rotational axes 160A-C of the roller segments 120A-C will be offset approximately 60° about the drive shaft rotational axis 15 relative to the roller segment rotational axes 260A-C of the roller segments 220A-C. Although keying features of three flat segments are illustrated in FIG. 6, additional and/or alternative keying features may be utilized such as a spline shaped keying features.

With continuing reference to FIG. 5 and FIG. 6, each roller segment 220A-C is over-molded onto a corresponding disc 262A-C. As illustrated by disc 262B in FIG. 5, each of the discs 262A-C includes multiple openings therein to enable a strong mechanical bond between the discs 262A-C and the material of the roller segments 220A-C in the over-molding process. It is noted that although the roller segment 220B is over-molded on the disc 262B, the roller segment 220B is illustrated in FIG. 5 as exploded away from the disc 262B.

Each of the discs 262A-C is coupled to a corresponding shaft 264A-C and freely rotates about the shaft 264A-C via corresponding bearings 263A-C interposed between the discs 262A-C and the shafts 264A-C. The shafts 264A-C are coupled to the frame 250 by inserting the shafts 264A-C into corresponding openings in the frame 250. Set screws may be screwed through corresponding set screw throughways 252A-C (FIG. 5) that extend into the openings in the frame, and the screws may contact the shafts 264A-C to fix the shafts 264A-C to the frame 250. Accordingly, in the implementation of FIGS. 5 and 6 the longitudinal centers of the shafts 264A-C define the roller segment rotational axes 260A-C. Also, in the implementation of FIGS. 5 and 6, the shafts 264A-C are each fixed and non-rotating, with the roller segments 220A-C freely rotating about the shafts 264A-C via bearings 263A-C. In other implementations, the shafts 264A-C themselves may rotate to enable rotation of the roller segments 220A-C. For example, the shafts 264A-C may have a rotating connection to the frame 250 and a fixed non-rotating connection to the roller segments 220A-C.

With reference to FIG. 5, each roller segment 120A-C is also over-molded onto a corresponding disc 162A-C. It is noted that although the roller segments 120A-C are over-molded on the discs 162A-C, the roller segments 120A-C are illustrated in FIG. 5 as exploded away from the discs 162A-C. Each of the discs 162A-C includes multiple openings therein to enable a strong mechanical bond between the discs 162A-C and the material of the roller segments 120A-C in the over-molding process. Each of the discs 162A-C is coupled to a corresponding shaft (shafts 164A and 164B are illustrated in FIG. 5) and freely rotates about the shaft via corresponding bearings (not illustrated) interposed between the discs 162A-C and the shafts. The shafts are coupled to the frame 150 by inserting the shafts into corresponding openings in the frame 150. Set screws may be screwed through corresponding set screw throughways (set screw throughways 152A and 152B are illustrated in FIG. 5) that extend into the openings in the frame 150, and the screws may contact the shafts to fix the shafts to the frame 150. Accordingly, in the implementation of FIG. 5 the longitudinal centers of the shafts define the roller segment rotational axes 160A-C. Also, in the implementation of FIG. 5, the shafts are each fixed and non-rotating, with the roller segments 120A-C freely rotating about the shafts via bearings. In other implementations, the shafts themselves may rotate to enable rotation of the roller segments 120A-C.

As illustrated in FIGS. 4-6, the roller segments 120A-C are arranged such that each of the roller segments 120A-C abuts the other two roller segments 120A-C at abutment areas. As used herein, abut means to contact or be in close proximity (e.g., within 5 millimeters). In particular, the chamfered portions of roller segments 120A and 120B are in contacting abutment; the chamfered portions of roller segments 120B and 120C are in contacting abutment; and the chamfered portions of roller segments 120A and 120C are in contacting abutment. It is understood that since the roller segments 120A-C are each freely rotating, the portions of the roller segments 120A-C that are in abutment at any given time will depend on the orientation of the roller segments 120A-C about their roller segment rotational axes 160A-C. As also illustrated in FIGS. 4-6, the roller segments 220A-C are likewise arranged such that each of the roller segments 220A-C abuts the other two roller segments 220A-C at abutment areas.

It is also noted that as illustrated in FIG. 6 and other Figures, the spherical segments 220A-C are arranged when assembled in roller assembly 210 such that the spherical zones of the three spherical segments 220A-C all partially conform to the same sphere. In other words, the spherical zone of spherical segment 220A approximates a first portion of a sphere, the spherical zone of spherical segment 220B approximates a second portion of the same sphere, and the spherical zone of spherical segment 220C approximates a third portion of the same sphere. Spherical segments 120A-C may likewise be arranged when assembled in roller assembly 110 such that the spherical zones of the three spherical segments 120A-C all partially conform to a same sphere. The spheres to which the spherical zones of spherical segments 120A-C and spherical segments 220A-C conform may be the same size.

Figure 7:
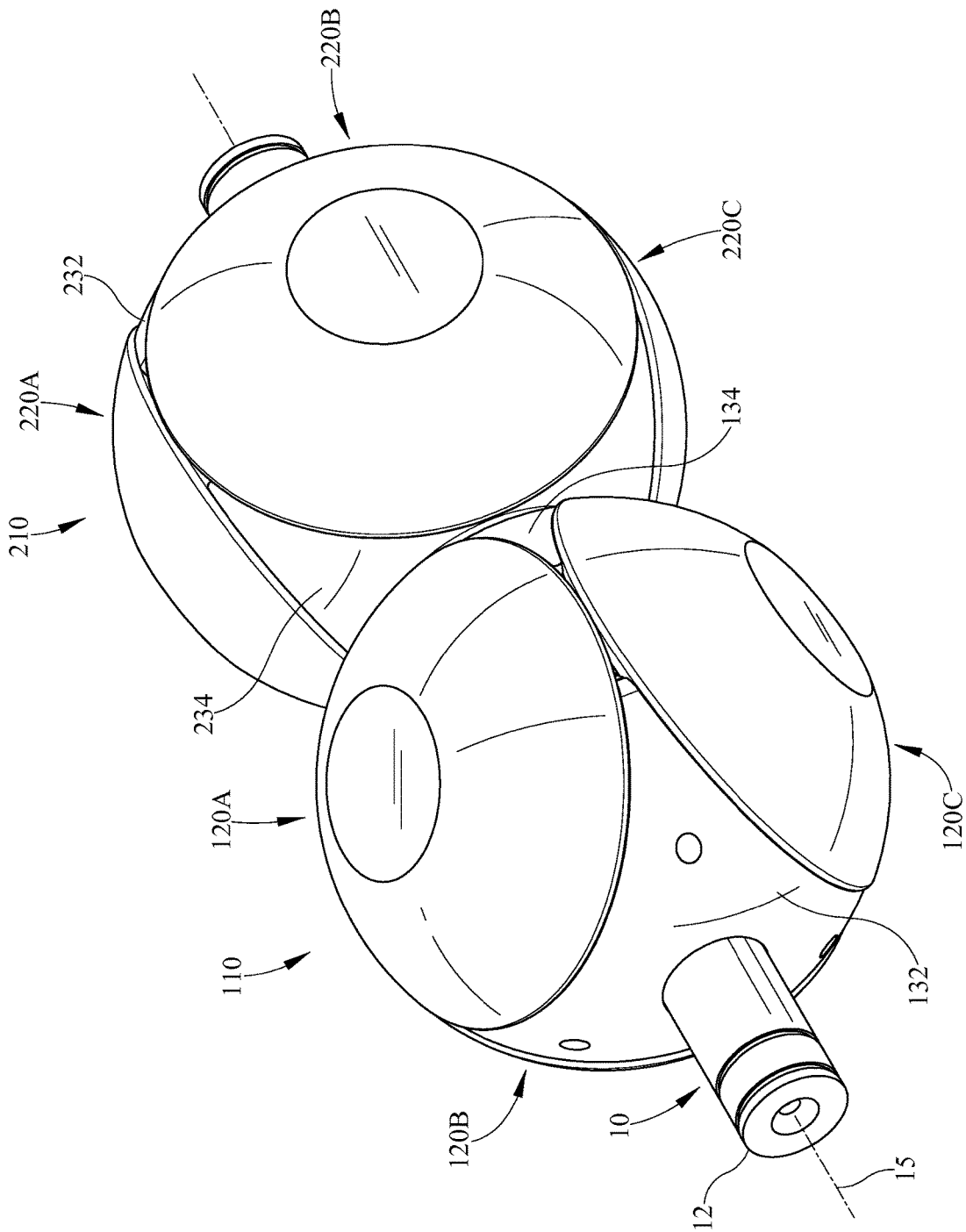
FIG. 7 illustrates the pair of roller assemblies and the drive shaft of FIGS. 4-6, with two covers provided on each of the roller assemblies that substantially cover openings between bases of the roller segments of the roller assemblies.

With reference to FIG. 7, the pair of roller assemblies 110 and 210 and the drive shaft 10 of FIGS. 4-6 is illustrated. However, in FIG. 7 covers 132 and 134 are included on the roller assembly 110 and covers 232 and 234 are included on the roller assembly 210. Each of the covers 132 and 134 is provided across a corresponding opening between the three roller segments 120A-C of the roller assembly 110. In some implementations, the covers 132 and 134 may be coupled to the frame 150 via screws that extend through openings in the covers 132 and 134 and engage corresponding receptacles of the frame 150. The covers 132 and 134 abut the chamfered edges of the roller segments 120A-C, but do not prevent rotation of the roller segments 120A-C about their axes 160A-C. The covers 132 and 134 may rotate about the drive shaft rotational axis 15 in unison with the corresponding roller segments 120A-C, but may optionally be otherwise fixed.

Likewise, each of the covers 232 and 234 is provided across a corresponding opening between the three roller segments 220A-C of the roller assembly 110. In some implementations, the covers 232 and 234 may be coupled to the frame 250 via screws that extend through openings in the covers 232 and 234 and engage corresponding receptacles of the frame 250. The covers 232 and 234 abut the chamfered edges of the roller segments 220A-C, but do not prevent rotation of the roller segments 220A-C about their axes 260A-C. The covers 232 and 234 may also rotate about the drive shaft rotational axis 15 in unison with the corresponding roller segments 220A-C, but may optionally be otherwise fixed.

Collectively, the exterior surfaces of the roller segments 120A-C and the covers 132 and 134 of the roller assembly 110 approximate a sphere with three flat surfaces (the three flat surfaces correspond to the tops of the roller segments 120A-C). Likewise, collectively, the exterior surfaces of the roller segments 220A-C and the covers 232 and 234 of the roller assembly 210 approximate a sphere with three flat surfaces (the three flat surfaces correspond to the tops of the roller segments 220A-C).

The covers 132, 134, 232, and 234 may prevent debris and/or other materials from entering the openings between roller segments of the roller assemblies, which may prevent or reduce negative impacts of certain materials that may be encountered by the roller assemblies. The covers 132, 134, 232, and 234 may also prevent a user from placing their fingers in the openings between the roller segments 120A-C and 220A-C.

FIG. 10 illustrates another pair of roller assemblies 310 and 410 coupled to the drive shaft 10. The roller assembly 310 includes three roller segments 320A-C and the roller assembly 410 includes three roller segments 420A-C. The roller assemblies 310 and 410 and their connections to the drive shaft 10 may be similar to that described above with respect to FIGS. 4-9. For example, the roller segments 320A-C and the roller segments 420A-C may be coupled to the drive shaft 10 in a similar manner as described above with respect to FIGS. 4-9. Moreover, the two roller assemblies 310 and 410 may be coupled to the drive shaft 10 such that the roller segment rotational axes of the roller segments 320A-C are offset approximately 60° about the drive shaft rotational axis 15 relative to the roller segment rotational axes of the roller segments 420A-C.

However, in distinction to the roller segments 120A-C and 220A-C of FIGS. 4-9, the roller segments 320A-C and 420A-C each include a freely rotating omnidirectional roller ball provided at the top thereof. Roller balls 327A, 327B, and 427B of roller segments 320A, 320B, and 420B are visible in FIG. 10. The roller balls are each coupled to a corresponding roller segment 320A-C, 420A-C, but freely rotate in all directions. For example, each of the roller balls may each be held by a corresponding socket and/or other structure molded into the corresponding roller segment. In some implementations, less than a hemisphere of a roller ball may extend out of the roller segment at any given time. In other words, in those implementations, the majority of the roller ball may be molded into the corresponding roller segment.

The roller balls each extend at least partially above the top of a spherical zone of a corresponding roller segment 320A-C and 420A-C(e.g., at least partially above the planar surface that truncates the top of the sphere to which the spherical zone partially conforms). In some implementations, the height of the roller balls above the top of a spherical zone of a corresponding roller segment 320A-C and 420A-C may be fixed. In some of those implementations, the uppermost extent (furthest from the drive shaft 10) of the roller ball of a spherical segment at any given time may conform to the top of the sphere to which the spherical zone of the roller segment conforms. In other words, the uppermost extent of the roller ball of a roller segment at any given time may be tangent to the sphere to which the spherical zone of the roller segment partially conforms.

The roller balls rotate in response to application of lateral force to the roller balls. For example, the roller ball 327A will rotate in response to contact with the ground and movement of the roller segment 320A about the drive shaft rotational axis 15 and/or movement of the roller segment 320A along the drive shaft rotational axis 15 (e.g., as a result of being pulled by rotation of another pair of roller balls rotating about a corresponding drive shaft). The roller balls may contact the ground, but since the roller balls freely rotate, they will reduce the singularity impact (relative to a roller segment without a "flat" top and/or without a roller ball) by preventing or reducing "sliding" of a roller assembly on the ground.

Figure 11:
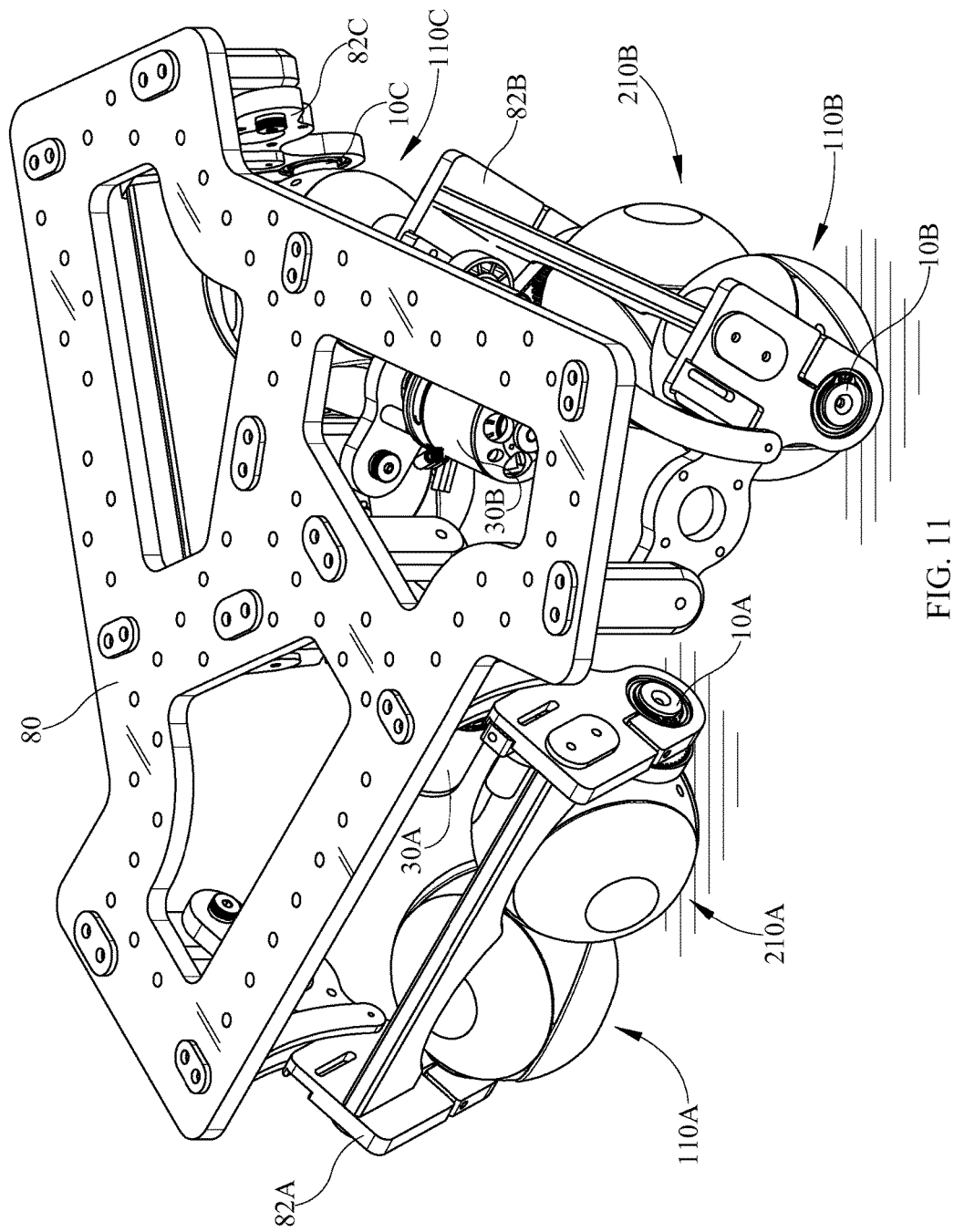
FIG. 11 illustrates an example of a holonomic base that includes three drive shafts, with each of the drive shafts having a pair of roller assemblies coupled thereto.

Multiple pairs of roller assemblies and corresponding drive shafts may be combined to achieve a holonomic mobile robot base for a holonomic drivetrain of a mobile robot. FIG. 11 illustrates one example of a holonomic base that includes three drive shafts 10A, 10B, and 10C, with each of the drive shafts 10A, 10B, 10C having a pair of roller assemblies coupled thereto. Roller assemblies 110A and 210A are coupled to drive shaft 10A. Drive shaft 10B is supported by bracket 82A and is driven by motor 30A. Roller assemblies 110B and 210B are coupled to drive shaft 10B. Drive shaft 10B is supported by bracket 82B and is driven by motor 30B. Roller assembly 110C and an additional roller assembly (not illustrated) are coupled to drive shaft 10C. Drive shaft 10C is supported by bracket 82C and is driven by an unillustrated motor. Main bracket 80 supports brackets 82A, 82B, and 82C. Various structures may be supported atop main bracket 80, such as additional robotic components. For example, main bracket 80 and additional robotic components may be combined to create a telepresence robot, a robot with gripper(s) and/or other end effector(s), and/or other mobile robot.

One or more hardware controllers (e.g., processor(s), application-specific integrated circuit(s)) may individually control of each of the motors 30A, 30B, and the unillustrated motor to thereby individually control the drive shafts 10A-C. Through individual control of each of the motors, holonomic control of the mobile robot base may be achieved. For example, driving each of the drive shafts 10A-C at the same speed may enable rotation about the origin, driving drive shaft 10A without driving the other two drive shafts 10B and 10C may enable locomotion in a first direction, driving drive shaft 10B without driving the other two drive shafts 10A and 10C may enable locomotion in a second direction, driving the three drive shafts 10A-C at variable speeds relative to one another may enable locomotion in a third direction, etc.

In some implementations, more than three pairs, or only two pairs, of roller assemblies may be utilized. For example, in some implementations two pairs of roller assemblies may be utilized, in combination with control software configured to reduce the likelihood of tipping. For instance, a first drive shaft with a first pair of roller assemblies and a second drive shaft with a second pair of roller assemblies may be coupled to a holonomic base so that the first drive shaft and the second drive shaft are mounted perpendicular to one another. Such a mounting may provide for holonomic movement of the holonomic base.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. An apparatus for a holonomic base, comprising:
a drive shaft comprising a first longitudinal end, a second longitudinal end, and a drive shaft rotational axis extending between the first longitudinal end and the second longitudinal end;
a first roller assembly and a second roller assembly each comprising three roller segments each coupled to the drive shaft, the three roller segments of the first roller assembly and the three roller segments of the second roller assembly each comprising an exposed exterior spherical zone;
wherein the spherical zone of each of the roller segments comprises a base and an opposite top, wherein the base has a base circumference that is larger than any top circumference of the top, and wherein the base is more proximal to the drive shaft than the top;
wherein each of the three roller segments of the first roller assembly rotates freely about a corresponding one of three roller segment rotational axes that each extend outward from the drive shaft through the corresponding roller segment of the first roller assembly;
wherein the three roller segment rotational axes are spaced approximately one-hundred-twenty degrees apart from one another relative to the drive shaft rotational axis;
wherein each of the three roller segments of the second roller assembly rotates freely about a corresponding one of three additional roller segment rotational axes that each extend outward from the drive shaft through the corresponding roller segment of the second roller assembly;
wherein the three additional roller segment rotational axes are spaced approximately one-hundred-twenty degrees apart from one another relative to the drive shaft rotational axis; and
wherein the roller segments of the first roller assembly and the roller segments of the second roller assembly are in fixed relation to one another relative to the drive shaft rotational axis.

2. The apparatus of claim 1, wherein the top of the spherical zone defines a circle having the top circumference that is smaller than the base circumference of the base.

3. The apparatus of claim 2, wherein the additional roller segment rotational axes of the roller segments of the second roller assembly are offset, relative to the drive shaft rotational axis, approximately sixty degrees from the roller segment rotational axes of the roller segments of the first roller assembly.

4. The apparatus of claim 3, wherein the roller segments of the first roller assembly and the roller segments of the second roller assembly each further comprises a corresponding one of six roller balls, each of the six roller balls being freely rotating, being coupled to a corresponding one of the roller segments, and extending above the top of the spherical zone of the corresponding one of the roller segments.

5. The apparatus of claim 1, further comprising a cover that covers a first opening between the bases of the roller segments of the first roller assembly, wherein the cover rotates about the drive shaft axis in unison with the roller segments of the first roller assembly.

6. The apparatus of claim 5, further comprising an additional cover that covers a second opening between the bases of the roller segments of the first roller assembly, wherein the additional cover rotates about the drive shaft axis in unison with the roller segments of the first roller assembly.

7. The apparatus of claim 1, wherein each of the roller segments of the first roller assembly further comprises a chamfered portion that extends inward from the base toward the drive shaft and that abuts the chamfered portion of the other roller segments of the first roller assembly.

8. The apparatus of claim 1, further comprising three first roller assembly roller segment shafts, each of the first roller assembly roller segment shafts coupled to a corresponding one of the three roller segments of the first roller assembly, coupled to the drive shaft, and extending along a corresponding one of the roller segment rotational axes.

9. The apparatus of claim 8, wherein each of the roller segments of the first roller assembly rotates about a corresponding one of the first roller assembly roller segment shafts and wherein each of the first roller assembly roller segment shafts is non-rotatably coupled to the drive shaft.

10. The apparatus of claim 9, wherein each of the roller segments of the first roller assembly is over-molded onto a corresponding insert and wherein each of the inserts is rotatably coupled to a corresponding one of the first roller assembly roller segment shafts.

11. The apparatus of claim 1, further comprising:
a first frame coupled to the drive shaft; and
a second frame coupled to the drive shaft;
wherein the first frame couples the roller segments of the first roller assembly to the drive shaft; and
wherein the second frame couples the roller segments of the second roller assembly to the drive shaft.

12. The apparatus of claim 11,
wherein the drive shaft comprises a first keying feature at a first location along the drive shaft and a second keying feature at a second location along the drive shaft,
wherein the first frame is coupled to the drive shaft at the first location and the second frame is coupled to the drive shaft at the second location, and
wherein the first keying feature restricts options for coupling of the first frame to the drive shaft at the first location and the second keying feature restricts options for coupling of the second frame to the drive shaft at the second location.

13. The apparatus of claim 12, wherein the first keying feature and the second keying feature collectively restrict the roller segment rotational axes of the roller segments of the second roller assembly to being offset, relative to the drive shaft rotational axis, approximately sixty degrees from the roller segment rotational axes of the roller segments of the first roller assembly.

14. An apparatus for a holonomic base, comprising:
a drive shaft comprising a first longitudinal end, a second longitudinal end, and a drive shaft rotational axis extending between the first longitudinal end and the second longitudinal end;
a first roller assembly and a second roller assembly each comprising at least three roller segments each coupled to the drive shaft, the roller segments of the first roller assembly and the roller segments of the second roller assembly each comprising:
an exposed exterior spherical zone, and
a corresponding roller ball;
wherein the spherical zone of each of the roller segments comprises a base and an opposite top, wherein the base has a base circumference that is larger than a top circumference of the top, and wherein the base is more proximal to the drive shaft than the top;
wherein each of the roller balls is freely rotating, is coupled to a corresponding one of the roller segments, and extends above the top of the spherical zone of the corresponding one of the roller segments;
wherein each of the roller segments of the first roller assembly rotates freely about a corresponding one of at least three roller segment rotational axes that each extend outward from the drive shaft through the corresponding roller segment of the first roller assembly;
wherein the roller segment rotational axes are spaced equidistant to one another relative to the drive shaft rotational axis;
wherein each of the roller segments of the second roller assembly rotates freely about a corresponding one of at least three additional roller segment rotational axes that each extend outward from the drive shaft through the corresponding roller segment of the second roller assembly;
wherein the additional roller segment rotational axes are spaced equidistant to one another relative to the drive shaft rotational axis; and
wherein the roller segments of the first roller assembly and the roller segments of the second roller assembly are in fixed relation to one another relative to the drive shaft rotational axis.

15. The apparatus of claim 14, further comprising a cover that covers a first opening between the bases of the roller segments of the first roller assembly, wherein the cover rotates about the drive shaft axis in unison with the roller segments of the first roller assembly.

16. The apparatus of claim 15, further comprising an additional cover that covers a second opening between the bases of the roller segments of the first roller assembly, wherein the additional cover rotates about the drive shaft axis in unison with the roller segments of the first roller assembly.

17. The apparatus of claim 14, wherein each of the roller segments of the first roller assembly further comprises a chamfered portion that extends inward from the base toward the drive shaft and that abuts the chamfered portion of the other roller segments of the first roller assembly.

18. The apparatus of claim 14, further comprising first roller assembly roller segment shafts, each of the first roller assembly roller segment shafts coupled to a corresponding one of the roller segments of the first roller assembly, coupled to the drive shaft, and extending along a corresponding one of the roller segment rotational axes.

19. The apparatus of claim 18, wherein each of the roller segments of the first roller assembly rotates about a corresponding one of the first roller assembly roller segment shafts and wherein each of the first roller assembly roller segment shafts is non-rotatably coupled to the drive shaft.

20. An apparatus for a holonomic base, comprising:
a drive shaft comprising a first longitudinal end, a second longitudinal end, a drive shaft rotational axis extending between the first longitudinal end and the second longitudinal end, a first keying feature at a first location along the drive shaft and a second keying feature at a second location along the drive shaft;
a first roller assembly and a second roller assembly each comprising a plurality of roller segments each coupled to the drive shaft, the roller segments of the first roller assembly and the roller segments of the second roller assembly each comprising an exposed exterior spherical zone;
wherein the spherical zone of each of the roller segments comprises a base and an opposite top, wherein the base has a base circumference that is larger than a top circumference of the top, and wherein the base is more proximal to the drive shaft than the top;

wherein each of the roller segments of the first roller assembly rotates freely about a corresponding one of a plurality of roller segment rotational axes that each extend outward from the drive shaft through the corresponding roller segment of the first roller assembly;

wherein the roller segment rotational axes are spaced equidistant to one another relative to the drive shaft rotational axis;

wherein each of the roller segments of the second roller assembly rotates freely about a corresponding one of a plurality of additional roller segment rotational axes that each extend outward from the drive shaft through the corresponding roller segment of the second roller assembly;

wherein the additional roller segment rotational axes are spaced equidistant to one another relative to the drive shaft rotational axis;

a first frame coupled to the drive shaft at the first location and coupling the roller segments of the first roller assembly to the drive shaft;

a second frame coupled to the drive shaft at the second location and coupling the roller segments of the second roller assembly to the drive shaft;

wherein the first keying feature restricts the coupling of the first frame to the drive shaft at the first location and the second keying feature restricts the coupling of the second frame to the drive shaft at the second location; and wherein the first keying feature and the second keying feature collectively restrict the roller segment rotational axes of the roller segments of the second roller assembly to being offset, relative to the drive shaft rotational axis, from the roller segment rotational axes of the roller segments of the first roller assembly.

* * * * *